United States Patent [19]

Hater et al.

[11] Patent Number: 4,850,745
[45] Date of Patent: Jul. 25, 1989

[54] BIOREMEDIATION SYSTEM

[75] Inventors: Gary R. Hater, Cincinnati, Ohio; Charles D. Goldsmith, Christiansburg, Va.

[73] Assignee: Sybron Chemicals, Inc., Birmingham, N.J.

[21] Appl. No.: 207,952

[22] Filed: Jun. 17, 1988

[51] Int. Cl.⁴ ........................ E02D 3/00; E02D 31/00
[52] U.S. Cl. ...................................... 405/258; 405/53; 405/128
[58] Field of Search ................. 405/128, 129, 53, 258, 405/264; 220/18

[56] References Cited

U.S. PATENT DOCUMENTS 4,624,604  11/1986  Wagner et al. .................... 405/128
4,678,582  7/1987  Lavigne .......................... 405/128 X

OTHER PUBLICATIONS

*In Situ Bioreclamation,* Case Study A: "Gasoline Contamination In Southern California", Registration Form for Seminar; Undated.

*Primary Examiner*—David H. Corbin
*Attorney, Agent, or Firm*—Marjama & Pincelli

[57] ABSTRACT

A system for treating soil contaminated by petroleum hydrocarbons which comprises applying a suitable bacterial culture capable of degrading petroleum hydrocarbons in a dry form to the bottom of an excavated cavity, applying gravel to a suitable depth over said dry cultures, providing a system of distribution piping capable of supplying nutrients directly to said cultures, and also an air flow through the area containing said cultures, and placing the appropriate tank in place within said cavity and covering with gravel and dirt.

The system is activated by providing said cultures with a source of nutrients through said piping followed by flowing air through the piping to facilitate metabolization of the hydrocarbons contained in the soil.

3 Claims, 2 Drawing Sheets

BIOREMEDIATION SYSTEM

BACKGROUND OF THE INVENTION

The present invention relates broadly to a bioremediation system and more specifically to a microbiological process for treating soil contaminants by metabolizing the components of petroleum hydrocarbons, such as gasoline, to $CO_2$ and water.

Typical in situ bioremediation systems introduce organisms and/or stimulate the indigenous bacteria. This technique can take periods of time up to several months depending on the hydrogeological setting. There exists a continuing need for improved bioremediation techniques which can be activated on demand when needed, and which are convenient and economical to use.

SUMMARY OF THE INVENTION

The present invention is directed to the concept of the *Bacterial Contaminant Interceptor TM (BCI) TM for use at sites requiring remediation of soil left in-place. The BCI uses selected bacteria capable of metabolizing all the components of petroleum hydrocarbons such as gasoline, diesel fuel, kerosene and used oil to $CO_2$ and water. *BCI is a biochemical filter in *Trademark of Sybron Chemicals Inc., Birmingham, N.J. which digestible gases feed the bacteria as air moves through the soil and pea gravel media. By contrast, soil venting generally uses more air and the air is passed through carbon for adsorption of the gasoline.

The BCI offers several advantages over conventional bioremediation techniques and soil venting. Some of these advantages are listed below:

1. Typical in situ bioremediation moves introduced organisms and/or stimulates the indigenous bacteria. This can take several months depending on the hydrogeologic setting. Through the present invention, time and services are saved by placing inactive dry bacteria in-place during reconstruction of a gasoline service station.

2. The bacteria in the BCI digest the benzene, toluene, and xylene fractions of gasoline directly, not through cometabolism like most indigenous organisms.

3. Since the gasoline vapors will be destroyed in situ, contingent liability will be reduced and the amount of carbon will be reduced or eliminated.

4. In grossly contaminated soils, greater than 500 ppm, the savings can be substantial by decreasing the time and spent carbon cost.

5. In porous soils the BCI will be extended into the contaminated area thereby utilizing in situ treatment to speed the entire reclamation process.

DETAILED DESCRIPTION OF THE INVENTION

Figure 1:
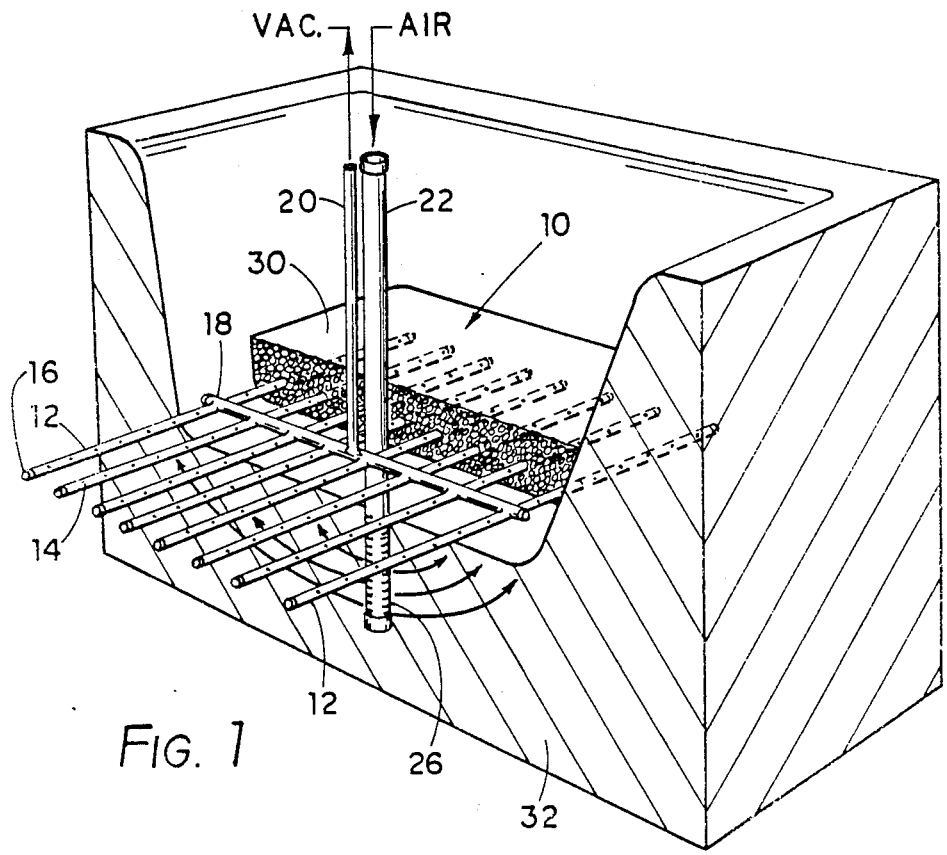
FIG. 1 is a perspective view of one embodiment of the piping structure of the present invention.

A typical application of the present invention is in the bioremediation of contaminated soil caused by a tank leak of gasoline or other petroleum hydrocarbons at a service station. The leaking tank(s) is first removed, leaving a cavity. Soil remaining in the tank cavity is made approximately level and bacteria cultures in dry form are distributed either by hand or with a rotary lawn spreader. The cultures are typically the ABR TM - gasoline blend. These are placed on a suitable carrier such as a bran fiber and dried to about 7 to 10% moisture. In this state they remain viable for at least one year before their population density decreases significantly. Initial microbial populations on the tank pit floor should be in the range of about $1 \times 10^{10}$ to $1 \times 10^{12}$ bacteria/foot squared. These microbes will become active when water and nutrients are later added to activate the system.

Suitable cultures available for use in the present invention are available under the ABR Trademark from Sybron Chemicals, Inc. of Birmingham, N.J. and are listed below in the Table.

TABLE

| | ABR TM GASOLINE CULTURE |
|---|---|
| 95% | Pseudomonas putida |
| 5% | Pseudomonas aeruginosa |
| | ABR TM DIESEL CULTURE |
| 20% | Pseudomonas putida |
| 20% | Pseudomonas alcaligenes |
| 20% | Pseudomonas aeruginosa |
| 30% | Arthrobacter crystallopoietes |
| 10% | Bacillus licheniformis |
| 100% | |
| | ABR TM SOLVENT CULTURE |
| 100% | Acinetobacter calcoaceticus bio. anitratus (acicba) for methyl ethyl ketone and methyl isobutyl ketone |
| 100% | Pseudomonas putida for benzene, toluene or xylene |

Pea gravel, having a size range of about ½ to 1 inch is then spread to a depth of about six to nine inches over the applied dry culture. Distribution piping is then laid out on top of the pea gravel at desired intervals with notches or holes through the pipe wall thickness about every three feet. One or two inch diameter piping made of black iron or galvanized steel able to withstand the weight and pressure from the fresh compacted fill dirt and gasoline tanks has been found to be suitable. All piping is connected to a central header with a vertical stand pipe for future hookup to be more fully described in conjunction with the drawings.

Pea gravel is then placed over the installed piping to a depth of about six to eighteen inches. Fill dirt and reconstruction relating to installation of the gasoline tank(s) can then commence. Lost time is less than six hours for most applications.

Activation of the system generally takes place two to four months after retanking and consists of the following:

Nitrogen and phosphorus demands are calculated based on estimated soil volume and gasoline concentration; Typical compounds which are used for nutrients include diammonium phosphate, ammonium chloride, potassium phosphate (mono and di-basic), ammonium nitrate, potassium nitrate, and sodium nitrate. Hydrocarbon concentration is determined in the contaminated soil using a gas chromatograph.

The theoretical chemical oxygen demand (COD) created by the presence of these hydrocarbons is calculated by balancing the chemical reaction (oxidation) of the hydrocarbon to carbon dioxide and water: Chemical contaminant (hydrocarbon) $+O_2 \rightarrow CO_2 + H_2O$;

Total theoretical nutrients required, i.e., nitrogen and phosphorus are calculated at 10% and 5%, respectively, of the calculated COD;

Water and nutrients are added to the gravel and dry culture (bran) to activate the bacteria;

Vacuum is started to supply oxygen to the bacteria and to draw hydrocarbon vapors across the bacteria containing area; Nitrogen and phosphorous may be added, if needed, through the existing piping at any future time.

Optionally during nutrient addition, a small dosage of surfactant may be added for diesel fuel and waste oil applications.

In practice the ratio of 100/10/5 (COD/nitrogen/phosphorus) is used to determine the ultimate needs of the system. The phosphorus value of five is inflated to allow for soil adsorption. This is standard practice in bioremediations. A minimum of 10% of this nutrient demand is added at the start-up and the remainder during the maintenance phase. Water and nutrients are added in a flooded-batch mode to float the organisms into the pea gravel. The pea gravel below the piping functions as the BCI unless the underlying soil is very porous sand, gravel, and/or composite. In this case the organisms will be partially washed into the native soil at start-up. Therefore, in porous conditions the BCI will also perform active in situ degradation of hydrocarbons in the surrounding soil and enhances the remediation.

Three process design option schematics or embodiments of the present invention which allow for variation in soil type, limited site size, and ongoing process manipulation are described as in the drawings as follows:

FIG. 1 illustrates one embodiment of a piping arrangement 10 of the present invention which is suitable for delivery of the nutrients and water to the cultures contained in the pea gravel. The piping is contained in cavity or tank placement area excavated from ground 32. The Bottom piping 12 is laid out at desired intervals with notches or holes 14 through the pipe wall thickness at intervals of about every 3 feet. The pipes 12 are capped at their ends 16 and connected to a central header 18 at their opposite ends. The header additionally contains a vertical stand pipe 20. In the illustrated embodiment a free standing PVC (polyvinyl chloride) pipe 22 about 4 to 6 inches in diameter is positioned adjacent a vertical stand pipe 20 which acts as the main component of a tank cavity well. Pipe 22 is positioned in the soil below the pea gravel in the capillary and unsaturated zone 24. The end of the pipe contains a standard well screen zone 26 which comprises slots through the pipe wall thickness to allow air flow through the bottom of the pipe. Both pipes 20 and 22 are encased in a cylindrical concrete sewer pipe 28 which provides an opening for future sampling of contaminated soil.

Figure 2:
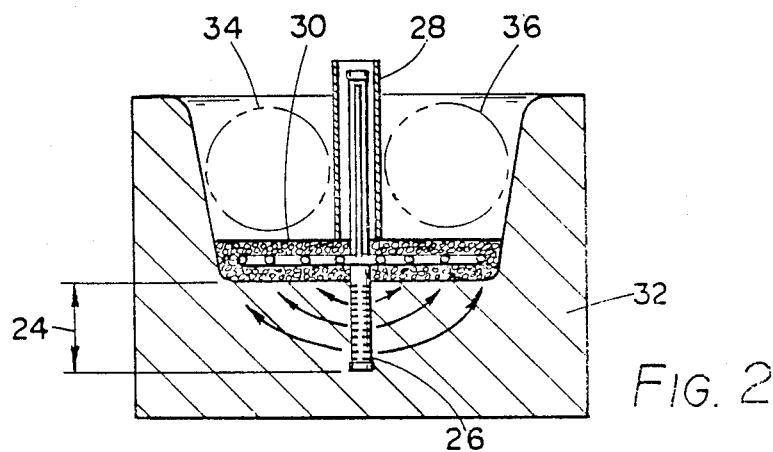
FIG. 2 is a side cross-sectional view of a tank placement area utilizing the piping structure of FIG. 1.

FIG. 2 illustrates a vertical sectional view of an excavated tank cavity with the piping arrangement of FIG. 1 in place in the pea gravel 30. The PVC pipe is positioned below the pea gravel and buried in the ground 32 adjacent the capillary and unsaturated zones 24. In this embodiment the tank cavity is approximately 40 feet by 40 feet square and 15 feet deep. The eventual location of dual 10,000 gallon gasoline tanks are illustrated in phantom by reference characters 34 and 36.

In operation, nutrients mixed with water are added through stand pipe 20 and flow through the holes 14 in pipes 12 into the pea gravel and contact the dry cultures. The passive air inlet at the open top of pipe 22 allows for a flow of air through the slots in the bottom of the pipe as illustrated by the arrows in FIG. 2 and this flow is continued by the use of a vacuum blower (not shown) which is attached to the top of stand pipe 20 in conjunction with piping 18 and 12 which then becomes a vacuum system. Organisms in the soil act as a biochemical filter. Vapors are digested as they pass through the soil and gravel media. Any standard vacuum blower such as a 1-½ to 2-½ HP Reeves Blower can be used in conjunction with pipe 20 to facilitate air flow through the system.

Figure 3:
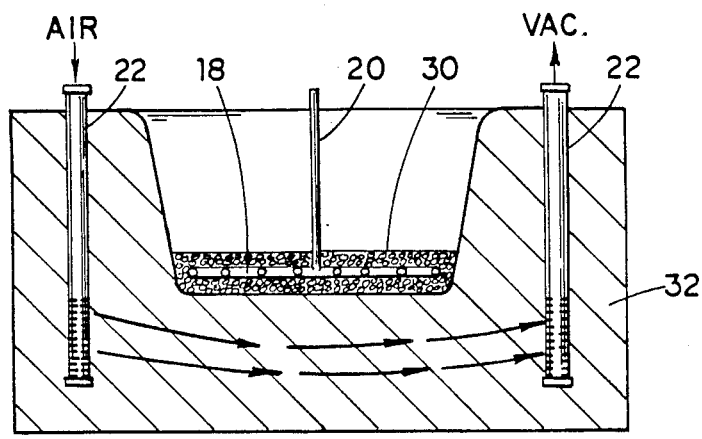
FIG. 3 is a side cross-sectional view of a tank placement area utilizing an alternative embodiment of the piping structure of FIG. 1.

In porous soils the dry in-place organisms will be washed into the soil below the gravel and in-situ degradation of the adsorbed contamination will compliment the vapor digestion simultaneously. In this situation the piping arrangement may change. As shown in FIG. 3 wells on one side of the contaminant will function as air in-put while wells on the other side of the site will function as a vacuum system. This option probably has the fastest remediation time. In this embodiment, as in that illustrated in FIG. 4, a plurality of wells or pipes are located along the sides of the tank placement area.

Figure 4:
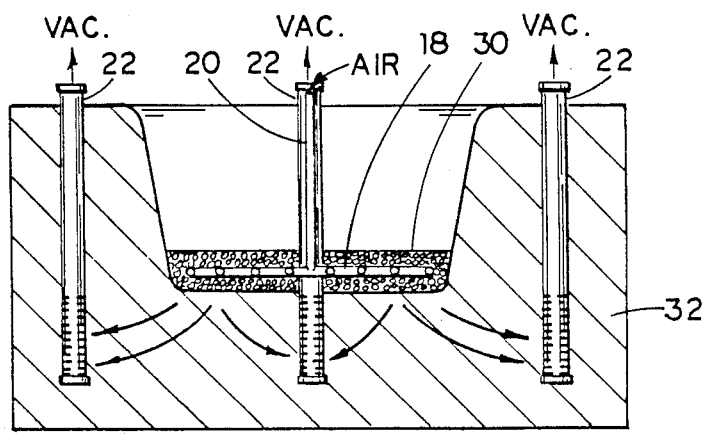
FIG. 4 is a side cross-sectional view of a tank placement area utilizing a further embodiment of the piping structure of FIG. 1.

In FIG. 4 the perimeter and/or tank cavity wells will function as the vacuum system while the original metal piping installed during retanking will serve as the air inlet. This option is especially beneficial when there is a perched contaminated aquifer. Not only can organisms be added to the vadose zone but also to the shallow aquifer. Furthermore, oxygen will maximize the aromatic degradation. The air flow in FIGS. 3 and 4 is illustrated by the arrows.

The geology for a particular application of the present invention will demand some manipulation and modification of the apparatus and process parameters.

Maintenance of the system will be conducted routinely and will involve nutrient addition and water replacement. Bacteria enumeration will be taken from split sample cores at least once a year. $CO_2$ evolution may possibly be used as a plausible degradation rate technique. However, it may be simpler to measure TPH (total petroleum hydrocarbons) in the off gases going to the above ground treatment system.

While the invention has been described in detail and with respect to specific embodiments thereof, it will be apparent to one skilled in the art that changes and modifications can be made therein without departing from the spirit and scope thereof.

What is claimed is:

1. A method for treating soil contamination by petroleum hydrocarbons which comprises:
   (a) applying in a dry form, a suitable bacterial culture capable of degrading petroleum hydrocarbons to the bottom of an excavated cavity,
   (b) applying gravel to a suitable depth over said dry cultures,
   (c) providing a system of distribution piping adjacent to said cultures, said piping being capable of supplying nutrients directly to said cultures, and also providing an air flow through the area containing said cultures, (d) placing the appropriate tank in place within said cavity and covering the gravel and dirt, and filling said tank with a petroleum hydrocarbon.

2. Activating the method as set forth in claim 1 by providing said cultures with a source of nutrients through said piping followed by flowing air through the piping to facilitate metabolization of the hydrocarbons contained in the soil.

3. The method of claim 1 in which the cultures are capable of degrading soil contaminated with at least one petroleum selected from the group consisting of gasoline, diesel fuel, kerosene and used oil.

* * * * *